No. 829,145. PATENTED AUG. 21, 1906.
O. DEL GUERRA.
BOTTLE STOPPER.
APPLICATION FILED JUNE 2, 1905.
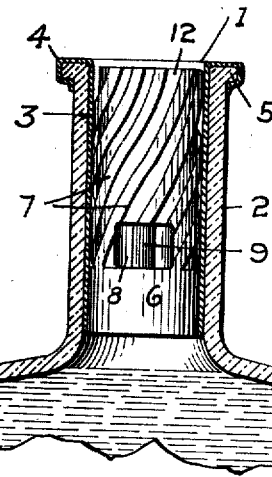
Fig. 1.
Fig. 2.
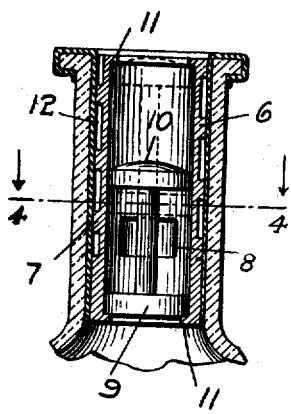
Fig. 3.
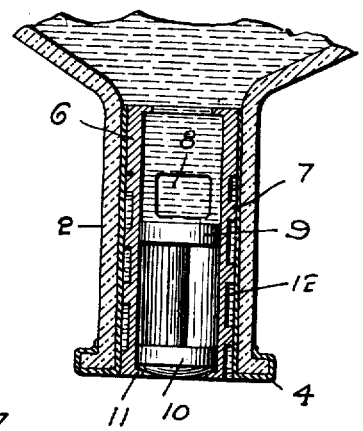
Fig. 4.
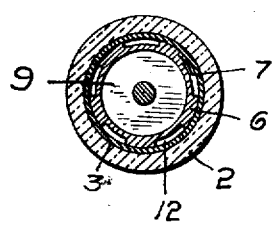
Witnesses
Inventor
Oreste Del Guerra,
By John L. Kindt
Atty.

UNITED STATES PATENT OFFICE.

ORESTE DEL GUERRA, OF CHICAGO, ILLINOIS, ASSIGNOR TO K. E. STACEY, OF CHICAGO, ILLINOIS.

BOTTLE-STOPPER.

No. 829,145. Specification of Letters Patent. Patented Aug. 21, 1906.

Application filed June 2, 1905. Serial No. 263,409.

*To all whom it may concern:*

Be it known that I, ORESTE DEL GUERRA, a subject of the King of England, residing in the city of Chicago, county of Cook, and State of Illinois, have invented a new and useful Improvement in Bottle-Stoppers, of which the following is a specification.

The object of my invention is to provide a stopper which is adapted to be attached to any ordinary bottle and which is so arranged that when the contents of the bottle has been emptied the bottle cannot be refilled unless supplied with the proper appliances, by means of which the bottle may be refilled.

With the above and various other objects in view, which will be plainly evident as the description proceeds, the invention consists in the novel construction and arrangement of parts, which will now be more fully described and claimed, reference being had to the accompanying drawings, forming a part of this specification, in which—

Figure 1 is a side elevation of my improved bottle-stopper in position in the neck of a bottle, which is shown in section. Fig. 2 is a vertical section of same, showing the plunger in position to prevent the refilling of the bottle. Fig. 3 is a vertical section showing the position of the plunger when the contents of the bottle is being emptied, and Fig. 4 is a cross-section on line 4 4 of Fig. 2.

As shown in the drawings, the numeral 1 indicates the bottle-stopper, which is constructed of metal or other suitable material, and 2 indicates the neck of a bottle.

3 indicates the outside casing of the stopper, the upper end of which is provided with the flange 4. When the stopper 1 is in position in the neck of the bottle 2, the flange 4 is adapted to be crimped around the top 5 of the bottle 2, thus rigidly holding the stopper 1 in position.

6 indicates the inner casing, which is provided on the outer surface thereof with a series of spiral corrugations 7. Near the lower end of the casing 6 are openings 8. The channels 12, formed by the spiral corrugations 7, lead into those openings. When the inner casing 6 is secured in the outside casing 3, the spiral corrugations 7 on the outer surface of the inner casing 6 will rest against the inner surface of the outer casing 3. The lower end of the inner casing 6 is rigidly secured to the outer casing 3. A plunger 9 operates in the inner casing 6 and is provided with the convex disk 10 on the upper end thereof. The plunger 9 is adapted to operate in the inner casing 6 and is prevented from falling out of said casing by reason of the flanges 11 on the upper and lower ends of the inner casing 6.

From the foregoing description it will be apparent that when the stopper is in position on a bottle the contents thereof can easily be emptied.

When the stopper is in position upon a bottle, as shown in Fig. 2, no liquid can be forced into the bottle, as the plunger 9 closes the opening on the lower end of the inner casing 6. In order to fill the bottle with liquid, it is necessary to employ a powerful magnet. When the neck of the bottle is placed a short distance below the magnet, on account of the magnetic attraction the plunger 6 will be drawn upward until it assumes the position as shown in dotted lines in Fig. 2. This causes the plunger 9 to be raised above the opening 8, and when liquid is poured into the top of the bottle same will flow through the channels 12 into the opening 8 and then into the bottle. The top of the disk 10 is convex-shaped and case-hardened steel and so arranged that unauthorized persons could not raise the plunger 9, and thus fill the bottle. When it is desired to empty the contents of the bottle, by turning the neck of the bottle downward the plunger 9 will move downward, as shown in Fig. 3, and the contents thereof will flow through the opening 8 and out through the channels 12.

Slight changes can of course be made in the general form and arrangement of the several parts herein described without departing from the spirit and scope of my invention. Hence I do not wish to be limited to the exact construction herein set forth.

What I claim as new, and desire to secure by Letters Patent, is—

1. A bottle-stopper comprising an inner and outer casing, a series of spiral corrugations on the inner casing, a plunger provided with a disk on the upper end thereof, adapted to operate in the inner casing, flanges on the upper and lower ends of said inner casing adapted to prevent the plunger from falling out of said inner casing, the inner casing having openings on the lower end thereof allowing the liquid in the bottle to flow into the channels formed by the corrugations between the inner and outer casing, substantially as described.

2. A bottle-stopper comprising an inner and outer casing, the inner casing having openings on the lower end thereof, a series of spiral corrugations on the inner casing leading into said openings, a plunger, provided with a disk on the upper end thereof, operating in the inner casing, flanges on the upper and lower ends of said casing adapted to prevent the plunger from falling out of the inner casing, substantially as described.

3. A bottle-stopper comprising an inner and outer casing, said inner casing having openings on the lower end thereof, a series of spiral corrugations on the inner casing leading into said openings, a plunger, provided on the upper end thereof with a convex-shaped disk, operating in the inner casing, said plunger when in its downward position closing the openings leading into the bottle and thus preventing the liquid from being forced into the bottle, substantially as described.

In testimony that I claim the foregoing as my invention I have signed my name in the presence of two subscribing witnesses.

ORESTE DEL GUERRA.

Witnesses:
WM. G. VOLKMAN,
K. SCHAFF.